United States Patent [19]

Halling

[11] Patent Number: 4,589,666
[45] Date of Patent: May 20, 1986

[54] SLIP JOINT ASSEMBLY FOR A SPLIT RING SEAL

[75] Inventor: Horace P. Halling, Laurel, Md.

[73] Assignee: Pressure Science Incorporated, Beltsville, Md.

[21] Appl. No.: 758,713

[22] Filed: Jul. 25, 1985

[51] Int. Cl.$^4$ .............................................. F16J 9/18
[52] U.S. Cl. .................................. 277/200; 277/218; 277/220
[58] Field of Search ............... 277/216, 218–222, 277/212 B, 200

[56] References Cited

U.S. PATENT DOCUMENTS

| | | | |
|---|---|---|---|
| 1,361,672 | 12/1920 | Blair | 277/218 X |
| 1,377,151 | 5/1921 | Baker | 277/218 |
| 2,826,468 | 3/1958 | Cowhig | 277/200 X |
| 3,245,693 | 4/1966 | Way. | |
| 3,313,553 | 4/1967 | Gastineau. | |
| 4,121,843 | 10/1978 | Halling. | |
| 4,218,067 | 8/1980 | Halling. | |
| 4,477,086 | 10/1984 | Feder et al. | |

FOREIGN PATENT DOCUMENTS

| | | | |
|---|---|---|---|
| 610973 | 9/1926 | France. | |
| 11057 | of 1904 | United Kingdom | 277/218 |
| 545856 | 6/1942 | United Kingdom | 277/200 |

*Primary Examiner*—Robert S. Ward
*Attorney, Agent, or Firm*—Roylance, Abrams, Berdo & Goodman

[57] ABSTRACT

A split ring seal assembly with a slip joint including a split ring having first and second free ends and a connecting member in the shape of a ring segment having first and second ends. The split ring seal has a multiple convoluted cross section with two outer flanges. The connecting element has a U-shaped transverse cross section. The split ring seal and connecting element are designed such that the connecting element fits within the split ring seal. The first end of the connecting member is fixedly attached to the first end of the split ring seal. The second end of the connecting member is slidably received within the second end of the split ring seal. This enables the split ring assembly to expand and contract as it is exposed to varying temperatures and pressures. The connecting element is comprised of two connecting members having curved portions and integral overlapping portions which are slidable relative each other. The curved portions of each of the connecting members is attached to one of the outer flanges at the first end of the split ring.

18 Claims, 5 Drawing Figures

SLIP JOINT ASSEMBLY FOR A SPLIT RING SEAL

FIELD OF THE INVENTION

This invention relates to ring seals for pressurized fluid joints. More particularly, this invention relates to split ring seals, including split rings and slip joint assemblies that connect the ends of the split rings, which expand and contract with the abutting joint members when subjected to varying temperatures and pressures.

BACKGROUND OF THE INVENTION

Seals of various types and shapes are employed to prevent fluid from escaping from a joint along a fluid flow path or in a fluid container. Joints in the flow path or in a container are of course formed whenever two or more members are brought together to form a continuous conduit or a fluid receptacle. One common type of seals are ring seals which are employed between members along the flow path or comprising a container to seal the gap between the two members, thus preventing fluid from escaping from between the two members. These two members often have grooves formed therein to receive the ring seal.

These ring seals are resilient due to their material and their geometric design, so that the ring seal fills the gap between the adjacent members defining the flow path. The desired result is that the ring seal will firmly abut both members at all points along the seal so that the gap is completely blocked by the ring seal.

Ring seals, while requiring a fairly wide radial dimension in order to achieve the desired flexibility, are sometimes designed to fit in very narrow annular spaces. The combination of this requirement and the accumulation of manufacturing tolerances on seal and groove diameters and widths can result in undesirable compromises and problems. To overcome these problems, split ring seals were developed to provide circumferential flexibility of the ring seals. Because of this circumferential flexibility, these split ring seals can be adjusted to fit in grooves which are only slightly wider than their radial dimension; thus eliminating the effects of seal and groove diameter tolerances. Other advantages of split ring seals are their ability to compensate for the effects of differential thermal expansion between the seal and the members forming the joint (thus avoiding circumferential thermal stresses) and the possibility of "springing" the seal open, so that it can be assembled over components which are larger in diameter than the seal groove (in the same way as piston rings are expandable to slip over the outside diameters of pistons until they can drop or snap into their recessed grooves).

A split ring seal is basically a continuous ring seal which has had a portion removed across a transverse cross section such that the ring seal can be opened at this split. Two free ends are formed by the split.

However, a split ring seal has the disadvantage that if the split ring is expanded such that the free ends are out of contact, a gap is formed between the free ends of the ring seal. Fluid can then escape through the gap. Thus, a simple split ring seal does not provide a complete seal under all pressures and temperatures, as is often desirable.

In response to this problem, split ring seals with slip joints have been developed. In these seals, the split ring seal assembly includes a slip joint formed by the ends of the split ring seal and a slidable element. The slidable element is in the shape of a ring segment having approximately the same curvature as the split ring seal. A first end of the slidable element is fixedly attached to the first free end of the split ring seal. The second end of the slidable element is slidably received within the second free end of the split ring seal. In these split ring seal assemblies, the second end of the slidable element slides within the split ring seal as the split ring seal assembly expands and contracts when subjected to varying temperatures and pressures.

An example of these ring seals is disclosed in U.S. Pat. No. 4,477,086, issued Oct. 16, 1984 to Feder et al. However, the ring seal assemblies disclosed in U.S. Pat. No. 4,477,086 have a number of disadvantages and are still inadequate for a number of reasons. First, this patent discloses that the split ring seal and the slidable element are of the same material and thickness. This design results in a slip joint which is relatively difficult to compress and not as resilient as desired. Also, since the split ring seal and the slidable element are the same thickness, the slidable element is more highly stressed than the ring seal due to the shorter dimensions of the slidable element and is easily compressed beyond its elastic limit. This is undesirable, as it results in relaxation of the joint elements, which permits an increase in leakage through the joint which partially offsets the advantages of using a slip joint.

Ring seals having cross sections of multiple convolutions are well known in the art (see for example, U.S. Pat. No. 4,121,843 entitled MULTIPLE CONVOLUTION SEALING RING issued to Horace P. Halling on Oct. 24, 1978). In many applications, these ring sea multiple convoluted cross sections are preferable because they provide a more effective and stronger seal between the members comprising the flow path. Moreover, seals of the multiple convoluted cross section may be constructed from a relatively thin metal or other material such that the load required to deflect and compress the seal is lower than for ring seals of other shapes. These seals can withstand greater deflection without failing than other types of seals. Also, since the fluid pressure can energize the seal between the outer flanges and the adjacent convolutions, the fluids actually help the seal perform its function.

It is apparent that there still exists a need in the art for a ring seal which can expand and contract when subjected to varying pressures and temperatures and to compensate for design tolerances and yet which provides an effective and durable seal to prevent fluid from escaping from the joint. There is also a self-evident need for the expansion joint to remain fully elastic and resist creep and relaxation at elevated temperatures; the stresses must also be low enough to avoid problems due to fatigue resulting from the cyclic deflections in the axial direction which the seal is intended to accommodate. This invention addresses these needs in the art, as well as other needs which will become apparent to those skilled in the art once given this disclosure.

SUMMARY OF THE INVENTION

Generally speaking, this invention provides a ring seal comprising a split ring having first and second ends defining a gap, the split ring having a resilient transverse cross section; means for bridging said gap, the bridging means including first and second connecting members, each of the connecting members bridging said gap and having first and second ends, the connecting members having overlapping portions which are slidable transverse to each other; the connecting elements being received in the split ring cross section with the first ends of the connecting elements being located inward of the split ring first end and the second ends of the connecting elements being located inward of the split ring second end; and means for rigidly coupling the first ends of the connecting elements to the split ring first end, the second ends of the connecting elements being slidable relative to the split ring second end.

In some embodiments of this invention, each of the connecting elements includes a straight portion integral with a curved portion. The straight portions overlap and the curved portions abut the split ring. The straight portions and curved portions may extend the length of the connecting elements.

In other embodiments, the connecting elements form a U-shape with the straight portions comprising the bottom of the "U" and the curved portions comprising the side flanges of the "U".

In further embodiments of this invention, the split ring is a multiple convolution split ring including two outer flanges. The curved portions of the connecting members are received between and abut the outer flanges.

In yet other embodiments of this invention, the outer flanges have concave portions which mate with the curved portions of said connecting members. These concave portions partially retain the connecting members within the split ring.

In further embodiments of this invention, the first connecting member is affixed to one of the side flanges at the first end of the split ring and the second connecting member is affixed to the other of the side flanges at the first end.

The ring seals according to this invention have many advantages over the prior art ring seals employable in the same environments. The ring seals according to this invention are more resistant to damage since they are free to expand and contract with their environment and since the connecting element is more resilient than the ring seal. This results in the slidable element being subjected to less stress than the ring seal, which is also desirable. In some embodiments, this is accomplished by the slidable element having a thickness less than the thickness of the ring seal.

Moreover, the split ring seals according to this invention are stronger and more durable than the prior ring seals with slip joints. These ring seals are also more effective due to the split ring having a multiple convoluted cross section and thus is capable of withstanding greater deflection. The ability of the connecting members to slide transverse to each another also increases the ability of the seal to deflect, thus increasing the effectiveness of the ring seal. The ring seals according to this invention more completely blocks gaps than the prior ring seals with slip joints, therefor permitting less leakage through the gaps being blocked by the ring seals.

DETAILED DESCRIPTION OF THE DRAWINGS

Figure 1:
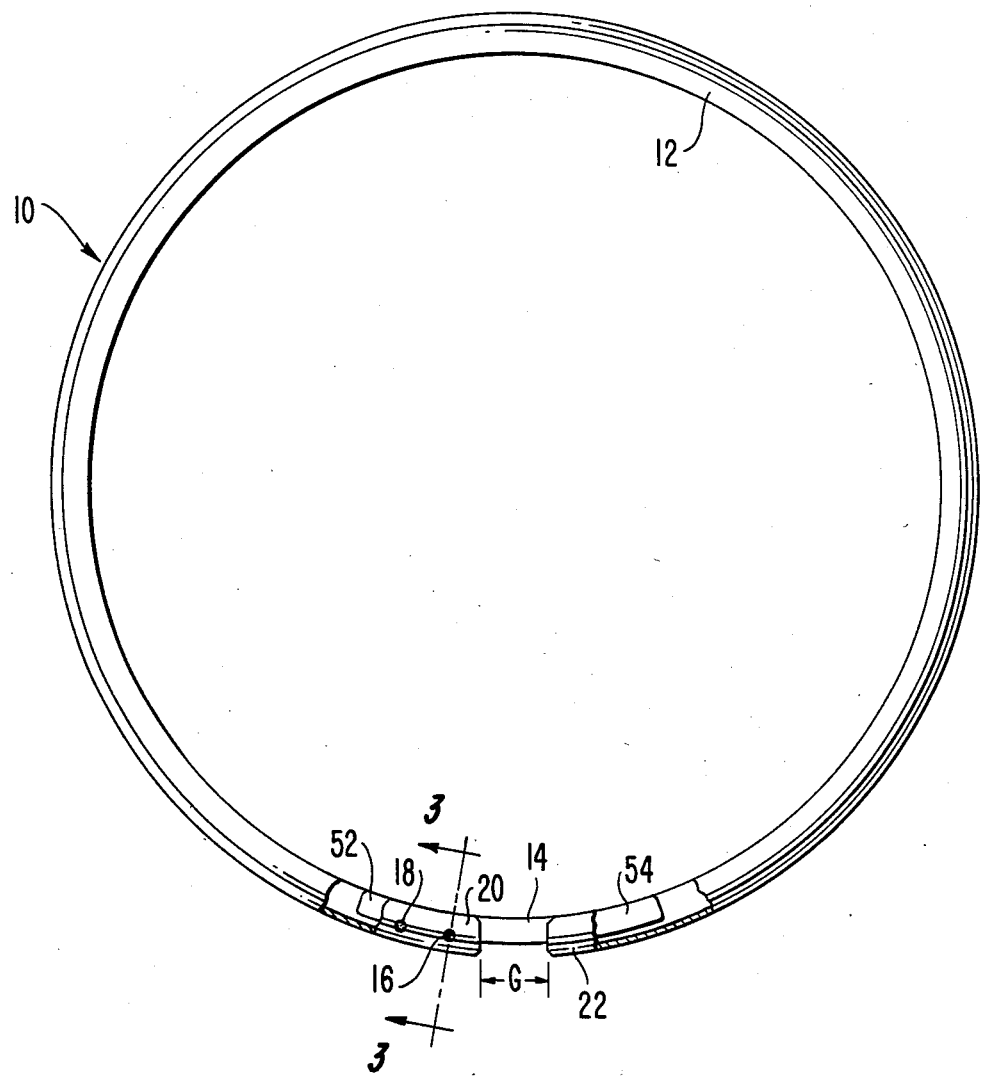
FIG. 1 is a plan view, partially cut away for clarity, of a ring seal assembly according to this invention.
Figure 3:
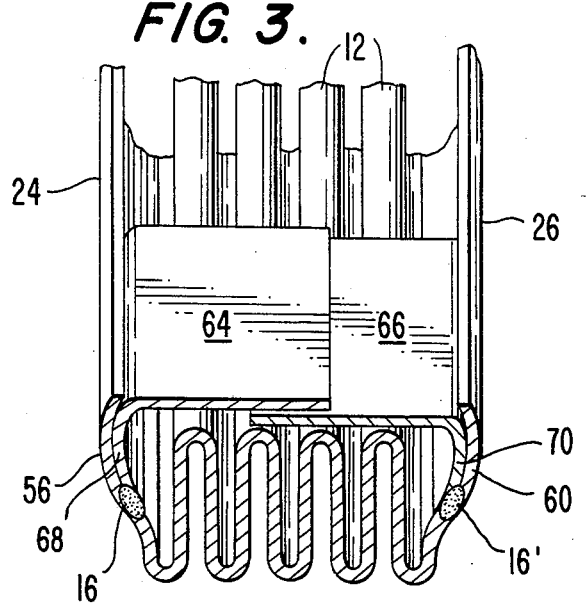
FIG. 3 is a partial cross-sectional view taken along line 3—3 of FIG. 1.

Referring to FIG. 1, a split ring seal assembly 10 with a slip joint assembly is illustrated. Split ring seal assembly 10 includes split ring seal 12, connecting element 14 and tack welds 16 and 18. A pair of tack welds are positioned on the bottom side of split ring seal 12 (as shown in FIG. 1) in complementary positions to tack welds 16 and 18, however, only tack weld 16' of the two complementary tack welds is visible in the Figures (see FIG. 3).

Split ring seal 12 is a ring seal having a transverse cross section cut therefrom to form a split ring. Split ring seal 12 has two free ends 20 and 22. A gap G is formed between ends 20 and 22. Split ring seal 12 is formed of resilient material and may be comprised of a sheet of metallic material which has been pressed in the shape illustrated in FIGS. 3 and 4.

Figure 4:
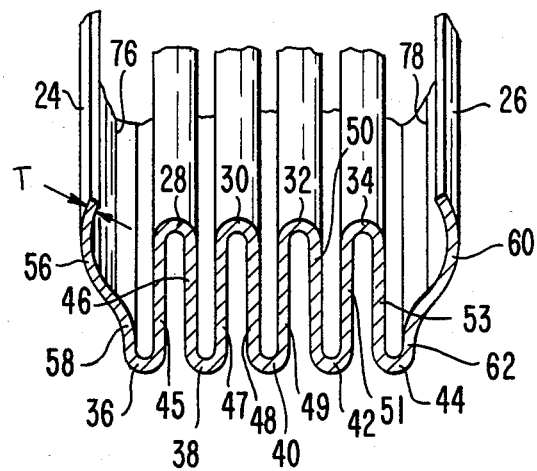
FIG. 4 is a partial cross-sectional view of the split ring illustrated in FIGS. 1-3.

Referring to FIG. 4, a transverse cross section of split ring seal 12 is illustrated. In the embodiment illustrated in the Figures, split ring seal 12 is a multiple convolution ring seal including outer flanges or arms 24 and 26, upper curved portions 28, 30, 32 and 34, lower curved portions 36, 38, 40, 42 and 44, and straight portions 45, 46, 47, 48, 49, 50, 51 and 53. All these portions are continuous as illustrated in FIG. 4. Straight portion 45 connects lower curved portion 36 with upper curved portion 28, straight portion 46 connects upper curved portion 28 with lower curved portion 38, straight portion 47 connects lower curved portion 38 with upper curved portion 30, straight portion 48 connects upper curved portion 30 with lower curved portion 40, straight portion 49 connects lower curved portion 40 with upper curved portion 32, straight portion 50 connects upper curved portion 32 with lower curved portion 42, straight portion 51 connects lower curved portion 42 with upper curved portion 34 and straight portion 53 connects upper curved portion 34 with lower curved portion 44. Straight portions 45, 46, 47, 48, 49, 50, 51 and 53 may be replaced by curved portions in other embodiments of this invention.

Outer flange 24 is comprised of concave portion 56 and convex portion 58. Likewise, outer flange 26 includes concave portion 60 and convex portion 62. Concave portions 56 and 60 are continuous with convex portions 58 and 62, respectively, forming sinuous legs in the general shape of S-curves. The lowermost ends of convex portions 58 and 60 are connected to and continuous with lower curved portions 36 and 44, respectively.

Lines of reversed curvature 76 and 78 are formed between the connection of the concave portions 56 and 60 with convex portions 58 and 62, respectively. Lines of reversed curvature 76 and 78 are the lines at which the curvature changes from concave to convex and the reverse.

Split ring seal 12 has a relatively constant thickness T (see FIG. 4). In fact, split ring seal 12 can be formed from a sheet of material having the thickness T.

Figure 2:
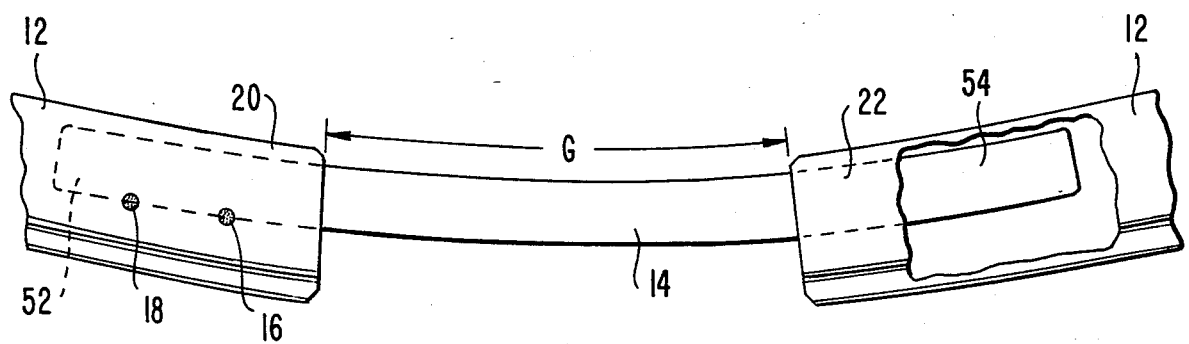
FIG. 2 is an enlarged view of the lower portion of the ring seal assembly illustrated in FIG. 1.
Figure 5:
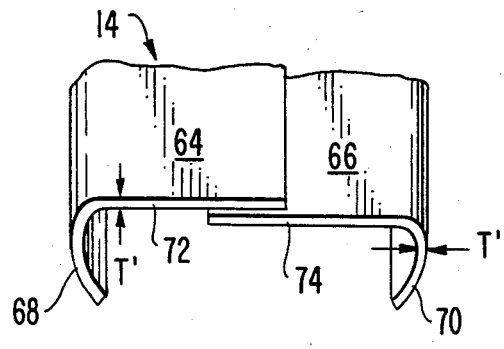
FIG. 5 is a partial perspective view of the connecting element illustrated in FIGS. 1-3.

Connecting element 14 forms a partial ring segment, having ends 52 and 54 (see FIGS. 1 and 2), with approximately the same curvature as ring seal 12. Connecting element 14 is comprised of a pair of connecting members 64 and 66 (see FIGS. 3 and 5). Members 64 and 66 are each made from a unitary sheet of resilient, metallic material having a thickness T'. Connecting members 64 and 66 can be of the same material as split ring seal 12 or preferably are made of a material more flexible than the material of which split ring seal 12 is comprised.

Connecting members 64 and 66 include curved portions 68 and 70 integral with straight portions 72 and 74, respectively. Straight portions 72 and 74 are designed to overlap and to slide transversely relative to each other (see FIGS. 3 and 5) as ring seal 12 is compressed.

Connecting element 14 has a thickness T' which is preferably less than the thickness T of split ring seal 12.

Tack welds 16 and 18 rigidly connect curved portion 68 of connecting member 64 to outer flange 24 at end 20. Likewise, tack weld 16' and the other bottom tack weld complementary to tack weld 18 rigidly connect curved portion 70 of connecting member 66 to outer flange 26 at end 20. The tack welds are preferably located in areas of low stress in split ring seal 12 and connecting members 64 and 66. In the embodiment illustrated in the Figures, these areas are at the bottom of curved portions 68 and 70 of connecting members 64 and 66 along the lines of reversed curvature 76 and 78. The tack welds are positioned at the areas of lowest stress to reduce the amount of further stress incurred on the split ring seal 12 and connecting element 14 due to the connection therebetween.

As illustrated in the Figures, end 54 of connecting element 14 is received within the second free end 22 of split ring seal 12. End 54 is free to slide within free end 22 as split ring seal assembly 10 contracts and expands due to varying temperatures and pressures. Also, connecting members 64 and 66 are free to slide toward and away from each other in the transverse direction as ring seal 12 is compressed and released.

In the embodiment illustrated in the Figures, curved portions 68 and 70 are received in and abut concave portions 56 and 60, respectively. The lower ends of curved portions 68 and 70 terminate above convex portions 58 and 62, respectively.

Split ring seal assembly 10 is employed by inserting it between two members comprising a fluid flow path or a fluid container. Such elements may be the flanges of two pipes carrying a pressurized fluid, two ring components of a gas turbine engine, etc. The seal is placed between the members and the members are brought together such that the split ring seal 12 and connecting element 14 are compressed. Since the split ring seals can be "split open", the ring seals may be placed around one or both of the members, if necessary. When connecting element 14 is compressed, connecting members 64 and 66 slide towards each other. In use, end 54 of connecting element 14 will slide with respect to free end 22 of split ring seal 12 as the seal assembly 10 and the adjoining members contract and expand when subjected to varying temperatures and pressures.

While the above invention has been discussed with particularity to a split ring having a convoluted cross section and a connecting element having a U-shape, other cross sections can be employed. Preferably, the cross sections of the ring seal has at least two side members having curved portions.

Advantageously, the split ring and connecting element are formed from a nickel alloy. In a ring having an outer diameter of about 31.280 inches (prior to splitting), thickness T of the material forming the split ring is about 0.008 inch ±0.001 inch (prior to forming) and thickness T' of the material forming the connecting element is about 0.005 inch ±0.001 inch prior to forming. In this configuration, the gap G is about 0.440–0.480 inch.

Also in this configuration, the w of ring seal 12 (uncompressed) is approximately 0.243 inch and the height of ring seal 12 is approximately 0.118 inch. Connecting members 64 and 66 have a length of approximately 2.5 inches, a width of approximately 0.140 inch and a height of approximately 0.070 inch. The combined width of connecting members 64 and 66 is approximately 0.233 inch.

Once given the above disclosure, other improvements, modifications and embodiments will become apparent to those skilled in the art. Such other improvements, modifications and embodiments are considered to be within the scope of this invention as defined by the following claims.

What is claimed is:

1. A ring seal comprising:
   a split ring having first and second ends defining a gap,
   said split ring having a resilient transverse cross section;
   means for bridging said gap,
   said bridging means including first and second connecting members, each of said connecting members bridging said gap and having first and second ends, said connecting members having overlapping portions which are slidable transverse to each other;
   said connecting elements being received in said split ring cross section with said first ends of said connecting elements being located inward of said split ring first end, and said second ends of said connecting elements being located inward of said split ring second end; and
   means for rigidly coupling the first ends of said connecting elements to said split ring first end, the second ends of said connecting elements being slidable relative to said split ring second end.

2. A ring seal according to claim 1 wherein
   each of said connecting elements includes a straight portion integral with a curved portion,
   said straight portions include the overlapping portions, and
   said curved portions abutting said split ring.

3. A ring seal according to claim 2 wherein
   said bridging means is U-shaped,
   said straight portions forming the bottom of the U-shape and the curved portions forming the side flanges of the U-shape.

4. A ring seal according to claim 2 wherein
   said straight portions and said curved portions extend the length of said bridging means.

5. A ring seal according to claim 4 wherein
   said curved portions have outer free ends,
   said coupling means is located adjacent said outer free ends.

6. A ring seal according to claim 4 wherein
   said split ring is a multiple convolution split ring having two outer flanges, said bridging means being received within said outer flanges.

7. A ring seal according to claim 6 wherein the curved portions of said connecting members abut the outer flanges of said split ring.

8. A ring seal according to claim 7 wherein said outer flanges have a concave portion, said curved portions being received by and abutting said concave portions.

9. A ring seal according to claim 8 wherein said split ring and said connecting elements are metallic.

10. A ring seal according to claim 6 wherein said first connecting member is affixedly attached to one of said side flanges at said first end of said split ring and the second connecting member is affixedly attached to the other of said side flanges at said first end of said split ring.

11. A ring seal according to claim 10 wherein said split ring and said connecting element are comprised of the same material.

12. A ring seal according to claim 10 wherein said bridging means is more resilient than said split ring.

13. A ring seal according to claim 10 wherein said split ring is comprised of a unitary sheet of material having a uniform thickness.

14. A ring seal according to claim 10 wherein each of said connecting elements are comprised of a unitary sheet of material having a uniform thickness.

15. A ring seal according to claim 10 wherein said coupling means is at least two spaced tack welds on each side of said first end of said split ring.

16. A ring seal according to claim 10 wherein said split ring is thicker than said connecting elements.

17. A ring seal comprising
a multiple convolution split ring having first and second ends defining a gap,
said split ring having a resilient cross section and including two outer flanges;
means for bridging said gap; said bridging means comprising a ring segment having approximately the same radius as said split ring,
said bridging means including first and second connecting elements having overlapping portions and integral curved portions which abut said outer flanges at said ends of said split ring;
said connecting elements having first ends located inward of and attached to the first end of said split ring and second ends located inward and slidable relative to said second end of the split ring;
said connecting elements being slidable relative each other in the transverse direction.

18. A ring seal according to claim 17 wherein
said outer flanges include concave portions,
said integral curved portion of said first connecting member being attached to the concave portion of one of said outer flanges at said first end of said split ring,
said integral curved portion of said second connecting member being attached to the concave portion of the other of said outer flanges at said split ring first end,
said overlapping and said integral curved portions extending the length of said bridging means.

* * * * *